United States Patent

[11] 3,596,730

| [72] | Inventor | Robert F. Cecce<br>New Carrollton, Md. |
|---|---|---|
| [21] | Appl. No. | 818,207 |
| [22] | Filed | Apr. 22, 1969 |
| [45] | Patented | Aug. 3, 1971 |
| [73] | Assignee | Fairchild Hiller Corporation<br>Montgomery County, Md. |

[54] STEERING SYSTEM
17 Claims, 11 Drawing Figs.

[52] U.S. Cl. ........................................................ 180/79.2 R,
280/91, 280/95 R
[51] Int. Cl. ........................................................ B62d 5/06,
B62d 7/16
[50] Field of Search ........................................... 180/45, 50,
79.2; 280/64, 91, 95

[56] References Cited
UNITED STATES PATENTS
2,512,979 6/1950 Strother ........................ 180/79.2

| 2,974,974 | 3/1961 | Merrit ......................... | 280/91 |
| 3,075,784 | 1/1963 | Beyerstedt .................. | 280/91 |
| 3,185,245 | 5/1965 | Hoyt ............................ | 180/79.2 |
| 3,202,238 | 8/1965 | Strader ........................ | 180/79.2 |
| 3,292,725 | 12/1966 | Hlinsky ........................ | 180/79.2 |
| 3,446,307 | 5/1969 | Logus ........................... | 180/79.2 |

FOREIGN PATENTS
99,432 6/1923 Switzerland ................... 180/79

*Primary Examiner*—Leo Friaglia
*Assistant Examiner*—Leslie J. Paperner
*Attorney*—Michael W. York ABSTRACT: This invention includes a steering system for use with a vehicle capable of exhibiting three modes of steering, said vehicle having forward and rearward wheels, the first of said modes comprising forward-wheel steering control of the vehicle, the second and third of said modes comprising forward- and rearward-wheel steering control of the vehicle, the system including means for converting one of said modes to another.

INVENTOR
ROBERT F. CECCE

BY Darby & Darby
ATTORNEYS

Patented Aug. 3, 1971
3,596,730
7 Sheets-Sheet 5
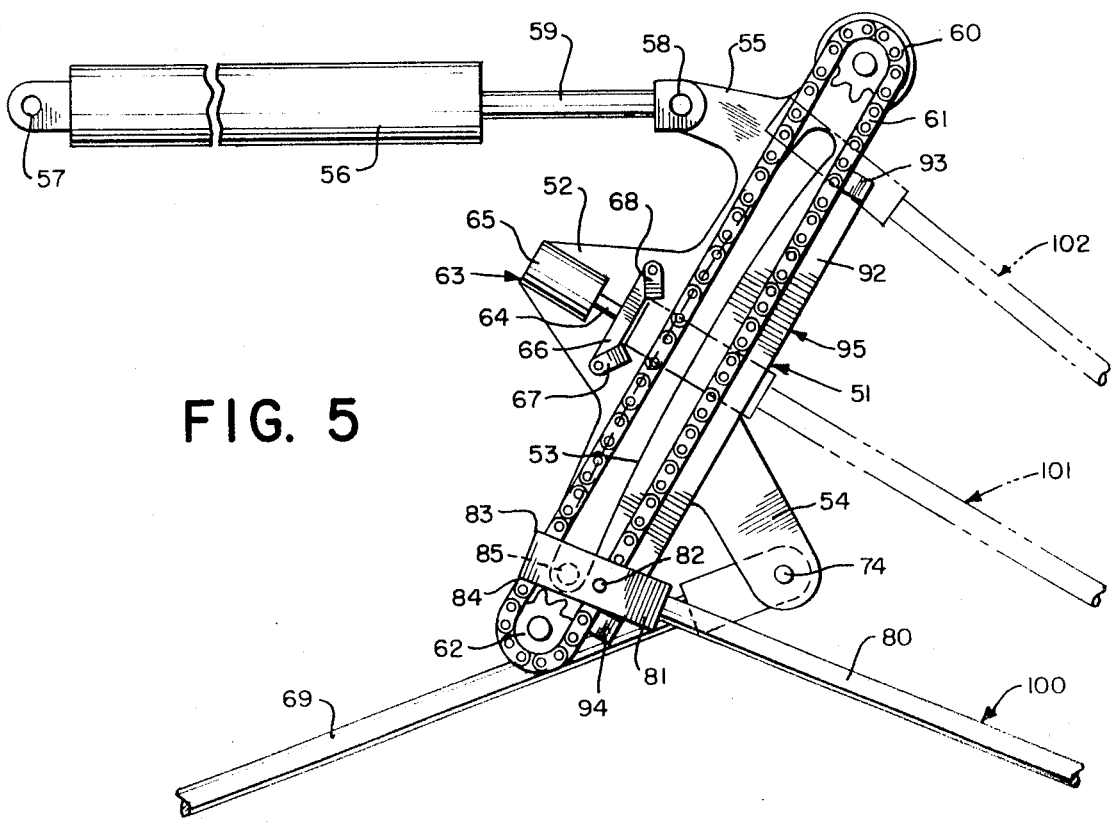
FIG. 5
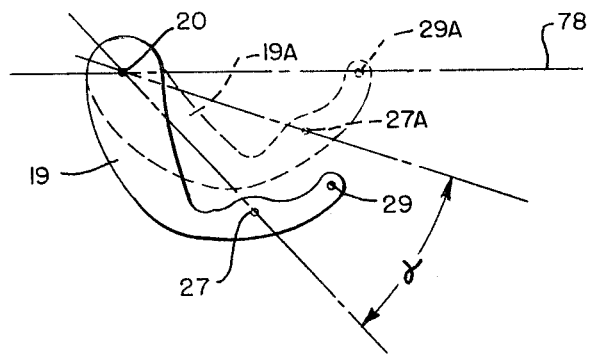
FIG. 6
VEHICLE CENTRAL LONGITUDINAL AXIS
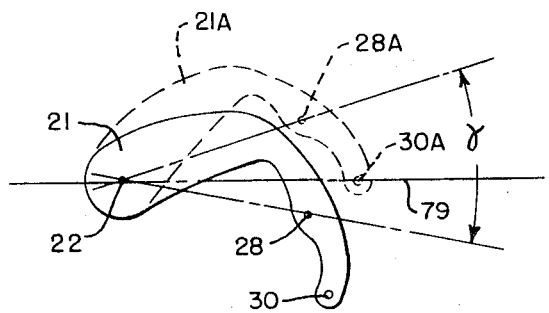
INVENTOR
ROBERT F. CECCE
BY Darby & Darby
ATTORNEYS

INVENTOR
ROBERT F. CECCE

BY Darby & Darby
ATTORNEYS

INVENTOR
ROBERT F. CECCE

BY Darby & Darby
ATTORNEYS

STEERING SYSTEM

This invention relates to a steering system for use with vehicles and more particularly to a multimode steering system capable of conversion from one mode to another.

A need exists for carrier land vehicles which will exhibit favorable maneuverability properties in restricted zones, and which will provide a stable carrier at higher speeds over longer distances. Distinct steering modes offer advantages in each case. Sidewise or crabbing movement as a result of all wheels being in parallel planes enables a vehicle to shift its position within a confined area without repetitive back-and-forth movements. On the other hand, front-wheel steering offers vehicle handling stability at higher speeds. For cases where front-wheel steering will be used to make numerous turns, use of the known and prevalent Ackerman-type steering mode will avoid slippage of the vehicle wheels when turning a curve, thereby minimizing tire wear.

Efforts to use vehicles possessing a front-wheel steering mode in confined areas has resulted in inefficient and wasted motion. Steering modes utilizing rear-wheel steering prove unstable at increased speeds. Attempts to provide multimode steering systems in a single vehicle have resulted in mechanically complicated structures which do not lend themselves to rapid and efficient changes from one mode to another.

It is an object of the present invention to provide a steering system for use with a vehicle which is capable of conversion from one steering mode to another.

Another object of this invention is to provide a steering structure which will exhibit three distinct steering modes; four-wheel steering, sidewise or crabbing steering, and front-wheel Ackerman-type steering.

A still further object of this invention is to provide a solenoid-valved hydraulic electrically responsive control system for converting the above steering system from one mode to another.

The present invention fulfills the above-mentioned objects and overcomes limitations and disadvantages of prior art solutions to problems. According to one aspect of the invention, a four-wheel vehicle having a frame structure supported by the wheels includes a steering system connected to a curved steering arm integral with each of the wheels. The steering system possesses three normal operating modes, each of which includes distinct steering characteristics. The first of these modes includes a crabbing or sidewise position in which all vehicle wheels are disposed in parallel planes such that no turning or pivoting around any wheel is experienced while the vehicle is in motion. A second mode includes a forward-wheel steering arrangement of the conventional Ackerman type wherein the turning radii of respective forward wheels vary from one another thereby eliminating wheel slippage during turning of the vehicle. A third steering mode includes an arrangement whereby the two forward wheels remain in either an Ackerman-type relationship or in first parallel planes which meet second parallel planes within which two rearward wheels are disposed.

A centrally located steering yoke is pivotally mounted on the vehicle frame, its position and movement being responsive to a main hydraulic steering cylinder similarly supported by the vehicle frame. A linkage interconnects the steering yoke with the wheel steering arms such that pivoting of the yoke in response to the steering cylinder will cause preselected wheels to turn.

Two tie assemblies interconnect the forward-wheel steering arms, each assembly including a hydraulic piston and cylinder assembly responsive to an electrically operated hydraulic control means. The tie assemblies are each adapted to expand and contract, their respective lengths being a function of pressure within each cylinder assembly. Thus the distance between portions of the forward-wheel steering arms may be predetermined, thereby establishing a steering mode. Manually operable switch means enables the user to convert any existing steering mode to another.

The invention will be more clearly understood from the following description of specific embodiments of the invention, together with the accompanying drawings, wherein similar reference characters denote similar elements throughout the several views, and in which:

FIG. 5 is an enlarged plan view of a steering yoke assembly associated with the steering system shown in FIGS. 1—3;

FIG. 6 is an enlarged plan view of steering arms of the present invention illustrating movements thereof;

FIGS. 7—10 are schematic representations of multilink embodiments of the invention.

Figure 1:
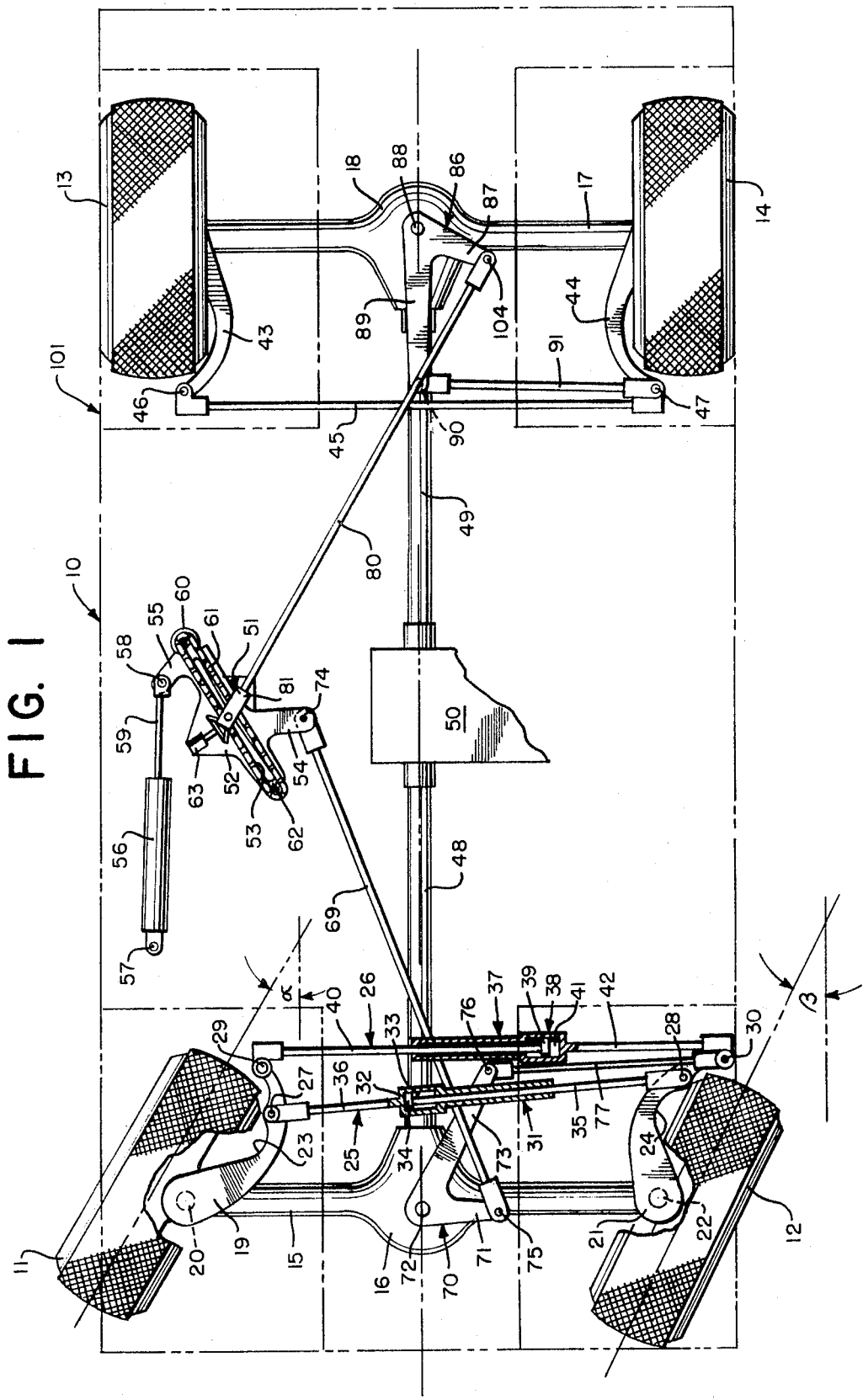
FIG. 1 is a partial sectional plan view of a steering system according to the present invention exhibiting an Ackerman-type front-wheel steering mode.
Figure 2:
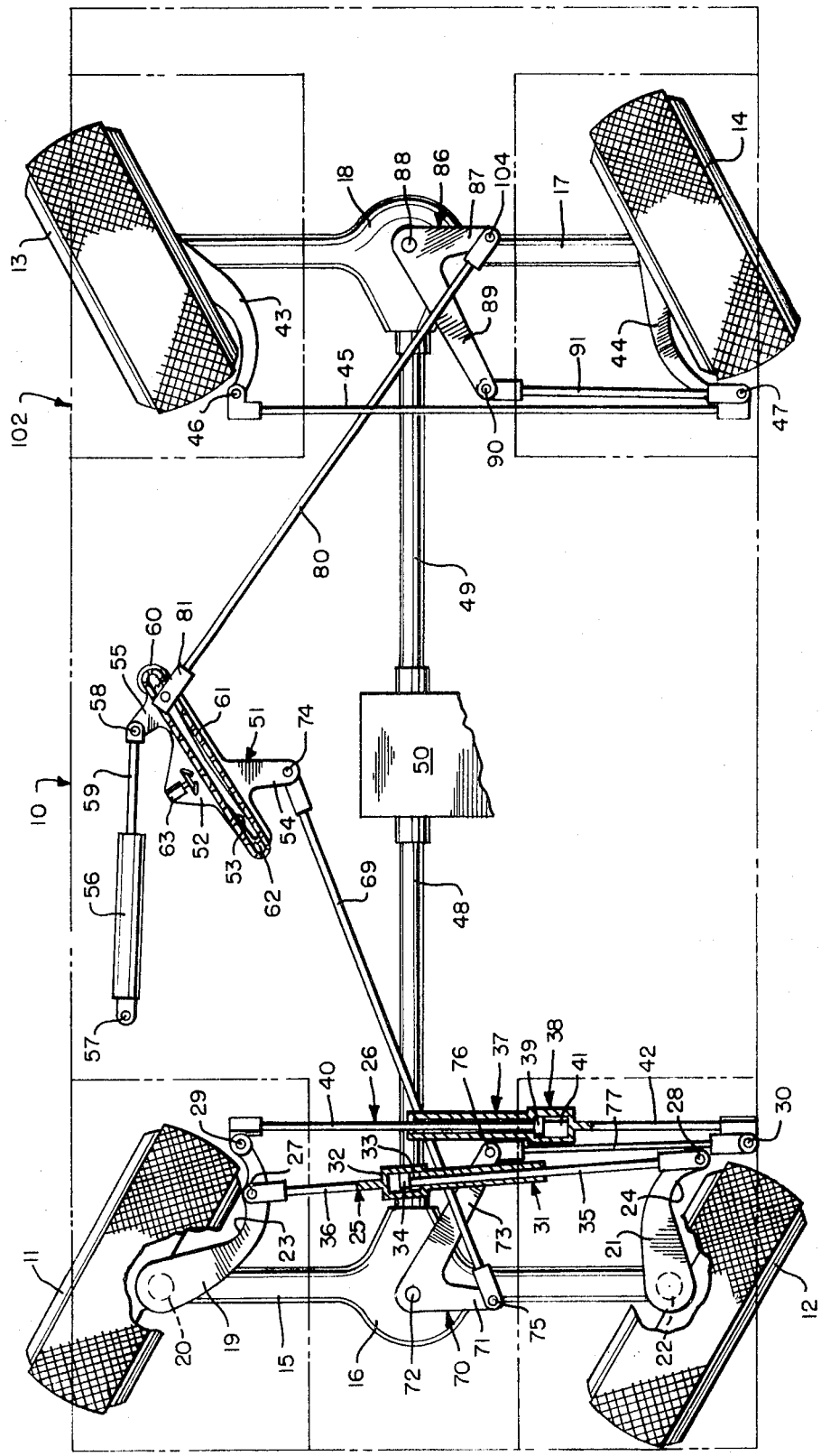
FIG. 2 is a partial sectional plan view of the steering system shown in FIG. 1 exhibiting a four-wheel steering mode.
Figure 3:
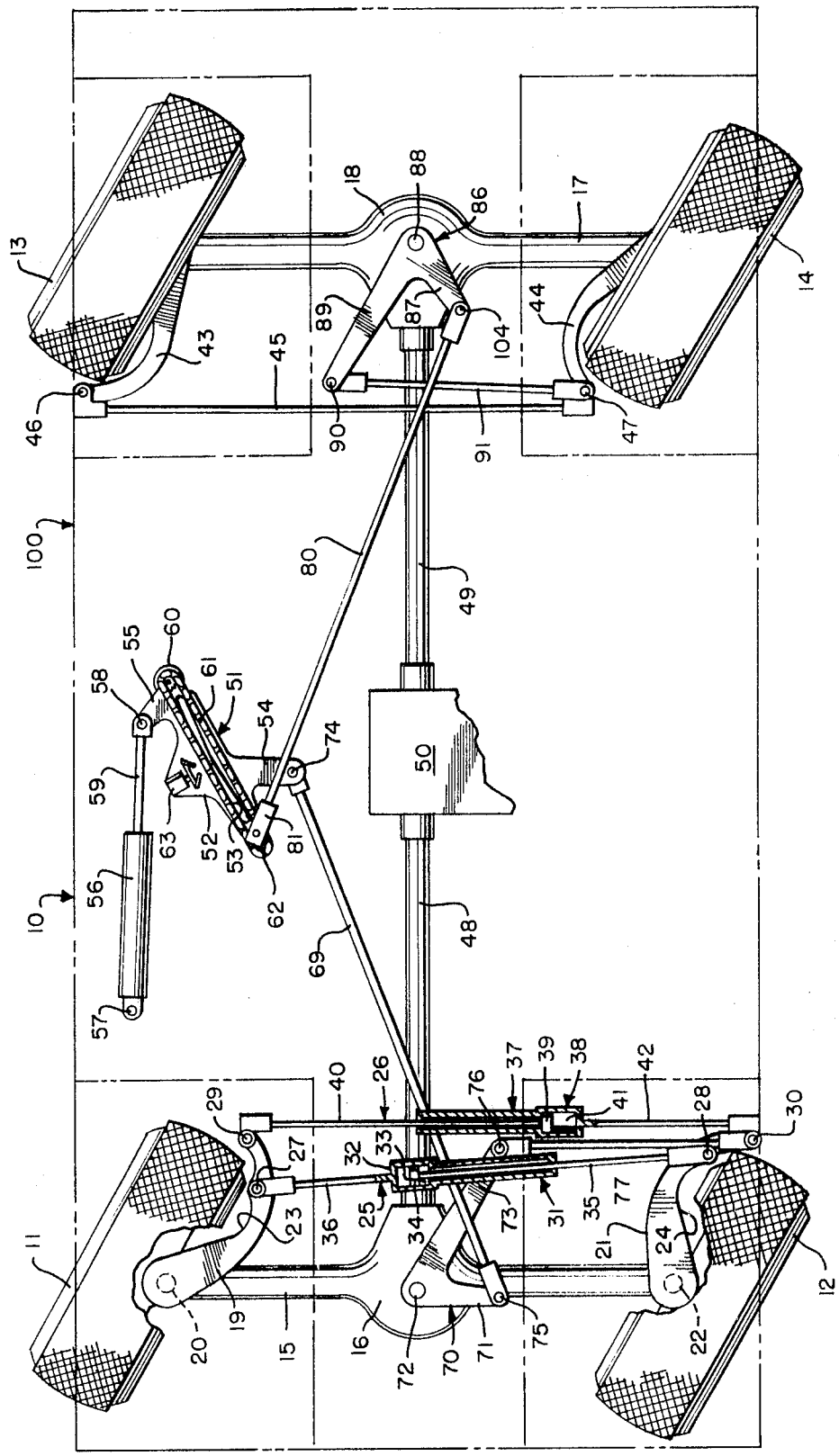
FIG. 3 is a partial sectional plan view of the steering system shown in FIG. 1 exhibiting a crabbing or sidewise steering mode.

Referring now in more detail to the drawings, FIGS. 1—3 illustrate one embodiment of the present invention in three distinct steering modes. A land vehicle, such as a self-propelled, self-loading multipurpose pallet carrier or other carrier-type vehicle having a steel or other suitable metallic frame structure supported by four wheels is represented by a phantom outline 10. Two forward wheels 11 and 12, and two rearward wheels 13 and 14 have identical tires. Wheels and tires 11 and 12 are interconnected by an axle journaled within axle housing 15 which extends transversely with respect to the longitudinal central axis of vehicle 10. Between wheels 11 and 12 axle housing 15 is enlarged to form a gear housing 16 within which a differential-type gear (not shown) is disposed. Similarly, rearward wheels 13 and 14 are interconnected by an axle journaled within axle housing 17, the latter extending substantially parallel with respect to axle housing 15 and being enlarged at its longitudinal midpoint to form gear housing 18.

A curved steering arm 19 is secured at point 20 to wheel 11. A curved steering arm 21 is secured at point 22 to wheel 12. Rotation of arms 19 and 21 in a given angular increment about axes extending vertically through points 20 and 22 will result in rotary movement or turning of wheels 11 and 12 in identical angular increments. Steering arms 19 and 21 are secured to wheels 11 and 12, respectively, such that clearance exists between inner curved portions 23 and 24 thereof and the respective tires, while further offering a maximum distance between the extremities of the steering arms and still remaining between the respective tires. Further reasons for using curved steering arms in this embodiment will become obvious from the description of FIG. 6 below. Of course other steering arm shapes, such as angular and multichordal configurations come within the scope of the invention.

Two tie bar assemblies or tie assemblies 25 and 26 are pivotally secured to and interconnect steering arms 19 and 21. Tie bar assembly 25 is secured at one end thereof to arm 19 at point 27, and at its opposite end to arm 21 at point 28. Assembly 26 is secured at one end to steering arm 19 at point 29 and at its opposite end to arm 21 at point 30. The distances from points 27 and 28 to points 20 and 22, respectively, are preferably less than the distances from points 29 and 30 to points 20 and 22, respectively. In addition, arms 19 and 21 are shaped such that points 27 and 28 do not lie upon lines extending from points 20 and 29, and 22 and 30, respectively.

Tie bar assembly 25, which shall hereinafter sometimes be referred to as the second actuatable tie assembly, includes a piston assembly 31 a portion of which is slidably disposed within portions of a cylinder assembly 32 forming a chamber 33. A pistonhead 34 is free to move within chamber 33 in response to relative movement being imparted to rod portions 35 and 36 of piston and cylinder assemblies 31 and 32, respectively, by relative movement between the forward steering arms 19 and 21. Upon hydraulic pressure of a preselected magnitude being introduced into chamber 33 by means described below, zero relative movement between piston and cylinder assemblies 31 and 32 is maintained such that tie bar assembly 25 forms a rigid and unyielding structure capable of transmitting forces from either of the forward steering arms to the other.

Tie bar assembly 26, which shall hereinafter sometimes be referred to as the first actuatable tie assembly, is constructed in much the same manner as assembly 25, consisting of a piston assembly 37, a portion of which is slidably disposed within portions of a cylinder assembly 38. Piston assembly 37 includes a pistonhead 39 secured to a rod portion 40, such as by welding, the pistonhead being slidably mounted for reciprocatory movement within a chamber 41 formed by cylinder assembly 38. A rod portion 42 of cylinder assembly 38 interconnects the walls of chamber 41 with steering arm 21. Relative movement between piston and cylinder assemblies 37 and 38 is reduced to zero upon hydraulic pressure of a predetermined magnitude being introduced into chamber 41 against a face of pistonhead 39 by means described below, thereby causing tie bar assembly 26 to act as a rigid and unyielding structure capable of transmitting forces between the forward steering arms. During operation of vehicle 10 while utilizing any of the steering modes described herein, one or the other of the tie bar assemblies 25 or 26 will be rigid, depending upon the mode established by a manually operated selector forming part of control means described below.

Referring now to the interconnection of rearward wheels 13 and 14, a curved steering arm 43 is secured to wheel 13 and a curved steering arm 44 is secured to wheel 14. Points 46 and 47 at an extremity of each of arms 43 and 44, respectively, are held a fixed distance from one another by rear tie rod 45. Tie rod 45 is pivotally secured at its ends to arms 43 and 44 at points 46 and 47, and is sufficiently rigid to transmit turning forces between steering arms 43 and 44 without buckling. The presence of tie rod 45 between arms 43 and 44 maintains rear wheels 13 and 14 in a parallel relationship with respect to one another in all steering modes herein described. It is within the scope of this invention, however, to provide other than parallel relationships between the rear wheels of vehicle 10.

Wheels 11, 12, 13 and 14 are powered by a conventional transmission system, shown schematically in FIGS. 1—3 as including drive shafts 48 and 49 interconnecting differential-type gears within gear housings 16 and 18 with central gear housing 50. Two- or four-wheel drive is attainable with vehicle 10, at the option of the user. It is also obvious that vehicle 10 may possess any number of wheels in various combinations, depending upon operating parameters.

Turning of the forward and/or rearward wheels is accomplished by a hydraulically actuated steering yoke assembly 51 interconnected with steering arms 19, 21, 43 and 44 by means of mechanical linkages. Steering yoke assembly 51 (FIG. 5) is mounted for rotation to the frame structure of vehicle 10 about a yoke axis and includes a base plate 52 formed with an arcuately extending slot 53 and further formed with projecting legs 54 and 55. A steering cylinder assembly 56 is pivotally secured at end 57 to the vehicle frame and at its opposite end 58 to leg 55. Actuation of cylinder assembly 56 by remote means, not shown, will cause an arm 59 thereof to move, thereby moving leg 55 and causing yoke assembly 51 to rotate. A hydraulic-type motor 60 is secured to base plate 52 and drives a link chain 61 around an idler sprocket wheel 62 secured for rotation at a point on plate 52 spaced from motor 60. Motor 60 causes chain 61 to move in a direction which is a function of valved hydraulic fluid supplied to motor 60 by the control means described in detail below.

A piston and cylinder centering unit 63 is fixedly secured to plate 52 with its longitudinal axis extending perpendicularly with respect to the direction of travel of chain 61. Centering unit 63 includes a hydraulic piston 64 slidably disposed within a cylinder 65. A centering member 66 is secured to piston 64, such as by welding, and carries two opposing rotatable spring-loaded latch members 67 and 68 each being normally biased such that members 67 and 68 each extend toward one another from the extremities of and at an angle with centering member 66. Actuation of piston 64 results in its moving centering member 66 toward chain 61 from its normally retracted position.

A forward-wheel tie rod 69 extends from and is pivotally secured at one end 74 to leg 54 of yoke assembly 51. Tie rod 69 is pivotally secured at its opposite end 75 to a leg 71 of a pivot member 70. Pivot member 70 is pivotally secured at point 72 on gear housing 16 for unobstructed rotation thereabout. Pivot member 70 is further formed with a second preferably longer leg 73, end 76 of which is connected to one end of a connecting rod 77. The opposite end of connecting rod 77 is secured to steering arm 21 at point 30. The ends of connecting rod 77 are pivotally secured to end 76 and point 30. Thus, rotation of steering yoke assembly 51 in a clockwise direction, as shown in FIGS. 1 and 5, results in leg 54 pushing tie rod 69 forward in compression against leg 71 of pivot member 70. The eccentric force upon leg 71 causes pivot member 70 to rotate about point 72, in turn causing leg 73 thereof to urge connecting rod 77 against steering arm 21 at extreme point 30, thereby turning wheel 12 in a clockwise direction. The aforedescribed interconnection of steering arms 19 and 21 via tie bar assemblies 25 and 26 results in a clockwise turning of wheel 11 an angle, the magnitude of which depends upon which of tie bar assemblies 25 or 26 is actuated and therefore rigid. For the case where tie bar assembly 25 is actuated, hydraulic pressure being supplied to chamber 33, a predetermined Ackerman-type steering mode is achieved whereby wheel and tire 11 turns an angle $\alpha$, with respect to the vehicle central longitudinal axis, which is greater than the angle $\beta$ turned by wheel and tire 12 as measured from the same axis (see FIG. 1). Since the inner tire during a turning of vehicle 10 has less distance to travel than the outer tire, a larger angle between the vertical tire plane and the centerline of the vehicle will decrease slippage of the tire against the roadway on which the vehicle is moving and will thus minimize tire wear.

The means by which different forward tire angles are achieved can best be seen in the representation of the forward-right-wheel steering arm 19 (FIG. 6) designated such in the full-line representation, and designated numeral 19A in the phantom-line representation. Similarly, steering arm 21 is designated such in FIG. 6, as shown in full line, and is designated numeral 21A as shown in the phantom-line representation. The phantom-line representations of arms 19A and 21A illustrate a position wherein wheels 11 and 12 are substantially parallel to the vehicle central longitudinal axis, the full-line representation indicating the position of wheels 11 and 12 as shown in FIG. 1. Possible front-wheel toe-in of wheels 11 and 12 has been assumed to be negligible for purposes of illustration.

In operation, pivoting of steering yoke assembly 51 in a clockwise direction will result, as previously described, in rotation of the forward steering arms from positions 19A and 21A, to the positions designated 19 and 21 in FIG. 6 for the case where tie bar assembly 25 is actuated and therefore rigid at its minimum length. The distance between points 27A and 28A is equal to the distance between points 27 and 28 at all times before, during and after the turning is accomplished. However, during this turning, the distance between points 29A and 30A will decrease such that the distance between points 29 and 30 will be smallest at maximum angular wheel deflection. It is during the turning of wheels 11 and 12 while assembly 25 is actuated that the tie bar assembly 26 is free to decrease from its normal operating length due to an unrestrained sliding of piston assembly 37 within cylinder assembly 38.

It can be seen from FIG. 6 that the net overall distance traversed by point 28A to its final position at point 28 in a direction parallel to the vehicle central longitudinal axis or centerline is smaller than the distance traversed by point 27A to its final position 27, while arm 19 rotates an angle $\alpha$ about point 20 and arm 21 rotates a lesser angle $\beta$ about point 22. The reason for this difference is the fact that point 27A initially lies offset from a line 78 extending through points 20 and 29A, line 78 being parallel to the aforementioned vehicle centerline. Thus, rotating point 27A an angle and away from line 78 results in increasing coordinate distances per angle of rotation in a direction parallel to line 78. Point 28A, on the other hand, is initially disposed an offset distance from a line 79 in an opposite direction from point 27A's offset from line 78, line 79 extending through points 22 and 30A and being parallel to line 78. Thus, a trapazoidal or Ackerman linkage is formed by steering arm 19, tie rod assembly 25, steering arm 21 and axle housing 15. Rotation of point 27A an angular increment $\alpha$ results in a lesser rotation $\beta$ of point 28A due to the trapazoidal or Ackerman arrangement of the linkage.

For the case where tie bar assembly 26 is actuated and kept rigid, the net distances traversed by points 29A and 30A are identical due to the fact that points 29A and 30A are initially located on lines 78 and 79, respectively, forming a parallel steering linkage.

Looking again at yoke assembly 51 and associated linkages, a rear-axle tie rod 80, which is formed with a header 81 to which a chain tiepin 82 is affixed, is shown in FIG. 5 in full-line representation in a crabbing or sidewise mode associated with FIG. 3. In phantom- and full line outline, Ackerman-type front-wheel steering, four-wheel steering, and crabbing modes are shown, the positions being designated 101, 102, and 100, respectively. Pin 82 extends downwardly toward and is secured to a portion of link chain 61 such that movement of the chain will result in movement of header 81 with the chain. Header 81 is formed with corners 83 and 84 at which its perpendicular sides converge. A guide pin 85 is secured to header 81, such as by welding, and extends downwardly through slot 53. During movement of chain 61 in response to motor 60, the path of guide pin 85 is defined by arcuate slot 53. At the end of rear-axle tie rod 80 opposite header 81, rod 80 is pivotally secured to a leg 87 at pivot point 104 on member 86. Pivot member 86 is, in turn, pivotally secured at a point 88 to gear housing 18 for unobstructed rotation thereabout. Member 86 is further formed with a second preferably longer leg 89, end 90 of which is pivotally secured to one end of connecting rod 91. Connecting rod 91 extends from end 90 and is pivotally secured to rear steering arm 44 at point 47. In the Ackerman-type steering mode position shown in FIG. 1, since the axis of guide pin 85 is coincident with the axis of rotation of the steering yoke assembly 51, rotation of the yoke assembly will not result in movement of rear-axle tie rod 80, and thus wheels 13 and 14 will not turn. FIG. 1 illustrates a front-wheel-only steering mode. Location of guide pin 85 in slot 53 in any position other than that shown in FIG. 1 will result in a turning of rear wheels 13 and 14 upon pivoting steering yoke assembly 51.

Figure 4:
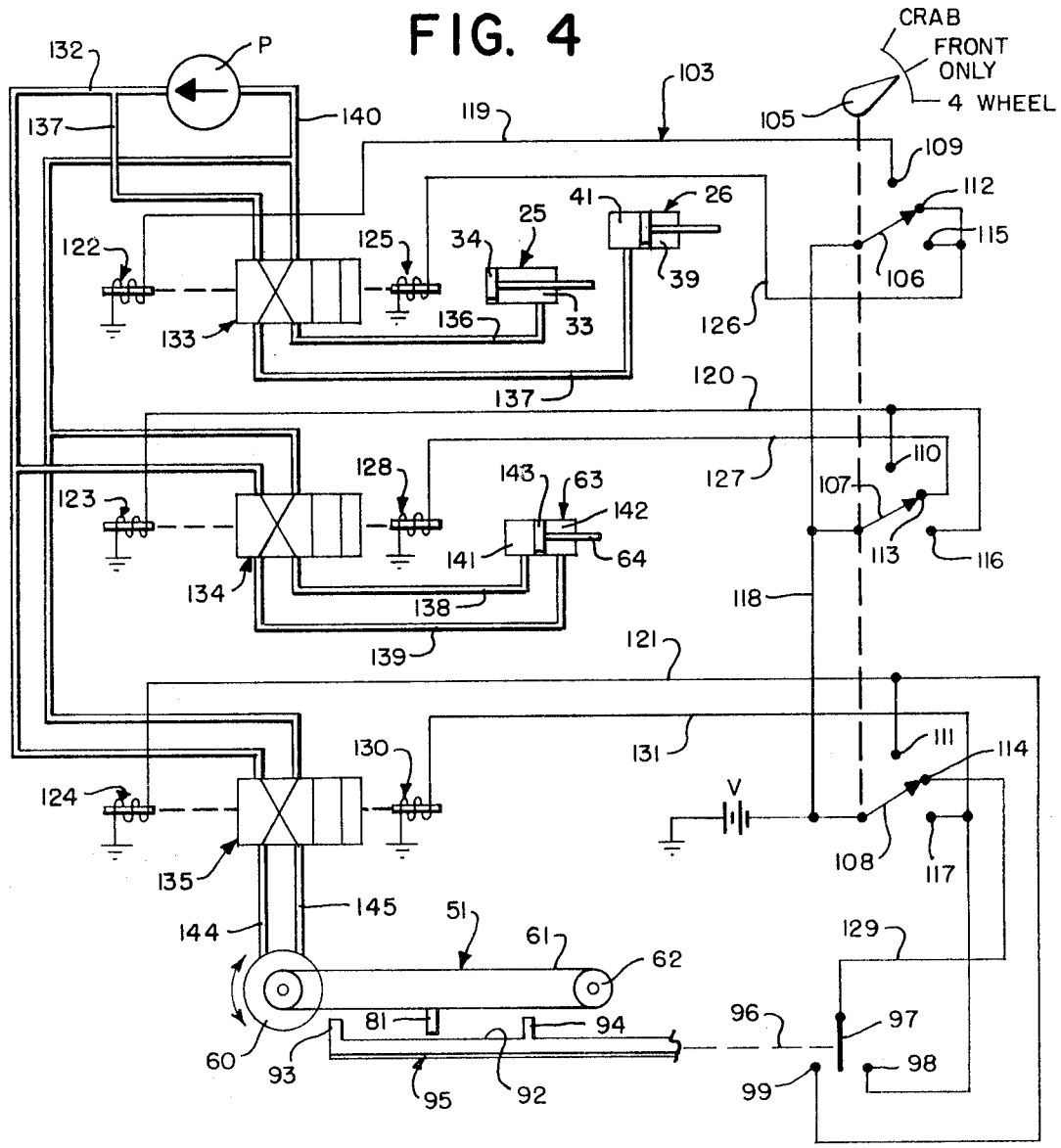
FIG. 4 is a schematic representation of control means for use with the steering system shown in FIGS. 1—3.

Header 81 moves within a recess 92 bounded by projections 93 and 94 which extend upwardly from sliding switch actuator 95 (FIGS. 4 and 5). An extension 96 of actuator 95 is secured to and integral with a contact 97 which is movable between terminals 98 and 99 of an electric circuit to be described below.

FIGS. 2 and 3 best illustrate the effect which the steering mode positions 100 and 102 will have upon the behavior of rear-axle tie rod 80 and header 81 during rotation of yoke assembly 51. In the four-wheel steering mode illustrated in FIG. 2, with rear-axle tie rod 80 in mode position 102, clockwise rotation of steering yoke assembly 51 results in a pushing and resultant compression of rear-axle tie rod 80 which, in turn, pushes leg 87 of pivot member 86 at point 104, thereby causing pivot member 86 to rotate in a counterclockwise direction about point 88. This latter rotation results in leg 89 of pivot member 86 transmitting steering forces into connecting rod 91 at point 90, whereupon these forces are transmitted into rear steering arm 44 at point 47, causing a turning of wheel 14. Wheel 13 turns an angle identical with angle turned by wheel 14, due to the rigid connection of steering arms 43 and 44 via tie rod 45.

During rotation steering yoke assembly 51 in the four-wheel steering mode described for FIG. 2, tie bar assembly 25 is actuated and remains rigid at its minimum length due to hydraulic pressure being supplied to chamber 41 within cylinder assembly 38 by the central means described below. Thus wheels 11 and 12 remain parallel, as do wheels 13 and 14. Extremely small turning radii are achieved with the four-wheel steering mode, rendering vehicle 10 especially suited for work in confined areas, such as warehouses.

FIG. 3 shows rear-axle tie rod 80 and header 81 in the crabbing steering mode position 100 of FIG. 5. In this position clockwise rotation of steering yoke assembly 51 results in a pulling of and the introduction of tensile forces in rear-axle tie rod 80 such that leg 87 of pivot member 86 is urged clockwise about point 88. The clockwise rotation of leg 89 of pivot member 86 pulls steering arm 44 in a clockwise direction via connecting rod 91, with a resulting clockwise turning of wheels 13 and 14 due to the interconnection of rear steering arms 43 and 44 via tie rod 45. The crabbing steering mode of FIG. 3 includes the tie bar assembly 26 in an actuated condition during pivoting of steering yoke assembly 51. The result is parallelism between all wheels 11, 12, 13 and 14 such that vehicle 10 may be moved in a sidewise direction with virtually no turning necessary. The similarity between this movement and that of the well-known crustacean gives rise to the term "crabbing" as used herein.

In the foregoing description of all turning and rotating for FIGS. 1—3, rotary movement of steering yoke assembly 51 as well as wheels 11—14 has involved what has been referred to as a resultant clockwise movement of the wheels. In practice this clockwise movement necessarily denotes a right-hand turning of vehicle 10 as shown in FIGS. 1—3. Of course yoke assembly 51 may be rotated in any given angular increment in either clockwise or counterclockwise directions depending upon the direction of reciprocatory actuation of steering cylinder 56, and thus wheels 11—14 may be turned in any angular increment to the right or left when moving forward or backward.

Referring now to FIG. 4, a preferred embodiment of a control system 103 is schematically shown as including hydraulic and electrical circuitry. A manually operable selector 105 is pivotally mounted to the vehicle frame within the reach of an operator of the vehicle, and is rotatable between three predetermined steering mode positions preferably designated "crab," "front only," and "4 wheel" to represent the steering modes of FIGS. 1—3. Selector 105 is shown in the "front only" or Ackerman-type steering mode position. Rotation of selector 105 between these three positions will simultaneously cause rotary contacts 106, 107 and 108 to turn an identical angle due to a conventional mechanical connection therebetween, such as a keyed shaft. Movement of selector 105 to the "crab" position will cause contacts 106, 107 and 108 to come into contact with terminals 109, 110, and 111, respectively. Similarly, movement of selector 105 to the "front only" position will cause contacts 106, 107 and 108 to electrically engage terminals 112, 113 and 114. Terminals 115, 116, and 117 represent the "4 wheel" position for selector 105. A voltage source V is located in branch line 118 between ground voltage and contacts 106, 107 and 108.

Terminals 109, 110 and 111 remain electrically connected to branch lines 119, 120 and 121, respectively, one end of each line terminating in grounded solenoids 122, 123 and 124. Line 120 terminates at its opposite end in terminal 116, while line 121 terminates at its opposite end in terminal 99. Terminals 112 and 115 are connected to a solenoid 125 via a line 126. Terminal 113 is connected via line 127 to a solenoid 128. Terminal 114 is electrically connected via line 129 to contact 97, while terminal 117 is connected both to a solenoid 130 and terminal 98 via line 131.

Looking now at the hydraulic circuitry associated with and cooperative with the electrical circuitry just described, a hydraulic pump P is shown in FIG. 4 in hydraulic line 132. Pump P maintains predetermined hydraulic fluid pressures in line 132. Hydraulic line 140 communicates with line 132 through the suction part of pump P. Three flow-reversing valves, 133, 134 and 135 are interconnected with line 132 and are disposed between and interconnected with movable portions of solenoids 122 and 125, 123 and 128, and 124 and 130, respectively. Actuation of any of these solenoids associated with a valve will cause a fluid-reversing element therewithin to move toward the windings of the actuated solenoid FIG. 4 illustrates solenoids 125 and 128 in an actuated state.

Tie bar assemblies 25 and 26 are schematically shown in FIG. 4, as is centering unit 63. Hydraulic lines 136 and 137 interconnect ports of valve 133 with cylinder chambers 33 and 41, respectively. Similarly, lines 138 and 139 interconnect ports of valve 134 with pressure chambers 141 and 142 on either side of pistonhead 143 of the piston 64 of centering unit 63. A pressure drop across pistonhead 143 induced in chambers 141 and 142 causes piston 64 to move in the direction of the lower pressure.

Hydraulic motor 60 is schematically shown in Fig. 4 connected to valve 135 via lines 144 and 145, the direction of rotation of motor 60 being a function of the pressure differential between lines 144 and 145. In the state shown, a tendency of clockwise rotation of motor 60 is induced by higher pressure in line 145 than in line 144. Counterclockwise rotation of motor 60 may be caused by rotation of selector 105 to the "crab" position, whereupon contact 108 will contact terminal 111, thereby actuating solenoid 124 and causing valve 135 to direct fluid of higher pressure from line 132 to line 144 rather than 145.

OPERATION

In operation, the operator of vehicle 10 decides which mode of steering will best serve the immediate vehicle carrying and maneuvering needs. Describing first the front-wheel or Ackerman-type steering mode shown in FIG. 1, the operator moves selector 105 to the "front only" position shown in FIG. 4 from either the "crab" or the "4 wheel" position, for example. This "front only" mode will afford the operator a relatively stable vehicle which may be driven at high speeds in unobstructed areas. Assuming movement of selector 105 from the "crab" position, this results in contacts 106, 107 and 108 coming into contact with terminals 112, 113 and 114, respectively. Solenoids 125 and 128 are thereby actuated due to a flow of current, induced by voltage source V, through lines 126 and 127. Valves 133 and 134, being responsive to solenoids 125 and 128, are also actuated such that flow of fluid at relatively higher pressure is caused from line 132 to lines 136 and 138. This, in turn, results in the higher pressure fluid entering chambers 33 and 141 of tie bar assembly 25 and centering unit 63, thereby urging pistonhead 34 to the left, as shown, and actuating centering unit 63 such that pistonhead 143 moves to the right. The movement of pistonhead 34 to the left results in a retraction of tie bar assembly 25 into a rigid unyielding condition while tie bar assembly 26 remains deactuated and nonrigid and therefore free to lengthen or shorten. Movement of pistonhead 143 to the right results in piston 64 of centering unit 63 moving centering member 66 toward chain 61 into the position shown in FIGS. 1 and 5.

Movement of contact 108 to terminal 114 from terminal 111 results in a flow of current through line 129, terminal 98, through line 131 and finally into solenoid 130, contact 97 initially being in electrical contact with terminal 98 as a result of the immediately previous "crab" position of selector 105. Valve 135 responds to solenoid 130 by causing higher pressure fluid from line 132 to enter line 145 thereby causing clockwise rotation of motor 60 and link chain 61. This clockwise rotation results in header 81 of the rear-axle tie rod 80 moving from an abutting relationship with projection 94 toward projection 93, its path being defined by guide pin 85 in slot 53 (FIG. 5). Approximately midway between projections 93 and 94, the corner 83 of header 81 comes into contact with and depresses spring-loaded latch member 67 of actuated centering member 66, causing same to rotate counterclockwise, as shown in FIG. 5, out of the path of header 81. Further movement of header 81 results in its being trapped or confined in the position shown in FIG. 5 with corners 83 and 84 disposed between latch members 67 and 68. Movement of header 81 is thereby prevented and the guide pin 85 is disposed substantially coaxially with respect to the axis of rotation of steering yoke assembly 51. Of course, in other embodiments of this invention, it may be the guide pin which is physically restrained between latch members 67 and 68 rather than the header 81 itself. The movement of selector 105 from the "4 wheel" position of FIG. 4 rather than the "crab" position as just described will also result in movement of header 81 toward centering unit 66, in this case from an abutting relationship with projection 93 due to contact 97 being in electrical contact with terminal 99. Again, header 81 will be held by latch members 67 and 68 of centering unit 66.

Turning of selector 105 to the "4 wheel" position from the "front only" position will afford the operator a highly maneuverable vehicle which may be operated in restricted areas. Contacts 106, 107 and 108 will come into electrical contact with terminals 115, 116 and 117, respectively, thereby causing the following action:

A flow of current through contact 106 into line 126 will actuate solenoid 125 and valve 133 such that flow of hydraulic fluid from line 132 at higher pressures will enter line 136 from valve 133, thereby causing tie bar assembly 25 to retract as a result of pressure entering chamber 33 and urging pistonhead 34 to the left, as shown. Tie bar assembly 26 remains free to lengthen or shorten, causing the front wheels 11 and 12 to remain in an Ackerman relationship with respect to one another.

A flow of current through contact 107, into line 120 will actuate solenoid 123 and valve 134, causing hydraulic fluid under higher pressures to enter line 139 from line 132, thereby resulting in chamber 142 of centering unit 63 being pressurized. Pistonhead 143 of piston 64 moves to the left, as shown such that centering member 66 is retracted away from link chain 61.

A flow of current through contact 108 and line 131 actuates solenoid 130 which was actuated when selector 105 was in the previous "front only" position. However, with centering member 66 retracted, movement of header 81 of rear-axle tie rod 80 is not obstructed or retarded and clockwise rotation of motor 60 and chain 61 results in header 81 traversing slot 53 until coming into contact with projection 93 of sliding switch actuator 95 in the location illustrated in FIG. 2. Contact between header 81 and projection 93 causes contact 97, which is integral with extension 96 of actuator 95, to move into electrical engagement with terminal 99. There is no current flow through contact 97 at any time except for the case when selector 105 is in the "front only" position and contact 108 is electrically coupled to terminal 114. Thus, either of solenoids 124 or 130 remain electrically connected to terminal 114 when selector 105 is not in the "front only" position. Movement of selector 105 to the "front only" position necessarily results in header 81 moving from either of projections 93 or 94 toward the other.

Movement of selector 105 to the "crab" position from the aforementioned "4 wheel" position of FIG. 4 results in contacts 106, 107 and 108 electrically engaging terminals 109, 110 and 111, with the following result:

A flow of current through contact 106 into line 119 will actuate solenoid 122 and valve 133 such that flow of hydraulic fluid from line 132 at higher pressures will enter line 137 from valve 133, thereby causing tie bar assembly 26 to elongate as a result of pressure entering chamber 41 and urging pistonhead 39 to the right, as shown. Tie bar assembly 25 remains deactuated and nonrigid and therefore free to lengthen or shorten, causing the front wheels 11 and 12 to remain in a constant parallel relationship with respect to one another.

Valve 134 remains unchanged since terminals 110 and 116 are both part of line 120. Valve 135 is actuated as a result of current flow through contact 108 and line 121 into solenoid 124. Higher pressure hydraulic fluid entering line 144 from line 132 causes motor 60 to rotate chain 61 in a counterclockwise direction, thereby shifting header 81 from an abutting relationship with projection 93 to an abutting relationship with projection 94. Switch actuator 95 shifts to allow contact 97 to electrically engage terminal 98, and the linkage interconnecting steering yoke assembly 51 with the vehicle wheels assumes the configuration shown in FIG. 3.

After moving selector 105 to the desired steering mode position, the operator of vehicle 10 actually steers the vehicle by actuating steering cylinder 56 in a conventional manner, such as by opening and closing two-way valve means or a master cylinder positioned by a conventional-type steering wheel, not shown here. This, in turn, will cause yoke assembly 51 to turn in a selected manner.

Figure 4A:
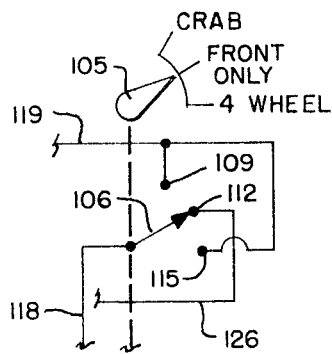
FIG. 4A is a schematic representation of another embodiment of a portion of the control means shown in FIG. 4.

In an embodiment of the invention wherein the "4 wheel" position or mode includes front wheels 11 and 12 operating in a constant parallel relationship with respect to one another, as opposed to the aforementioned Ackerman-type relationship, the portion of the circuit of FIG. 4 including selector 105 and contact 106 is arranged as shown in FIG. 4A. In this embodiment, on turning the selector 105 to the "4 wheel" position from the "front only" position, for example, a flow of current through contact 106 into line 119 will actuate solenoid 122 and valve 133 such that flow of hydraulic fluid from line 132 at higher pressures will enter line 137 from valve 133, thereby causing tie bar assembly 26 to elongate as a result of pressure entering chamber 41 and urging pistonhead 39 to the right, as shown. Tie bar assembly 25 remains free to lengthen or shorten, causing the front wheels 11 and 12 to remain in a constant parallel relationship with respect to one another, as opposed to the Ackerman mode already described for FIG. 4.

Figure 7:
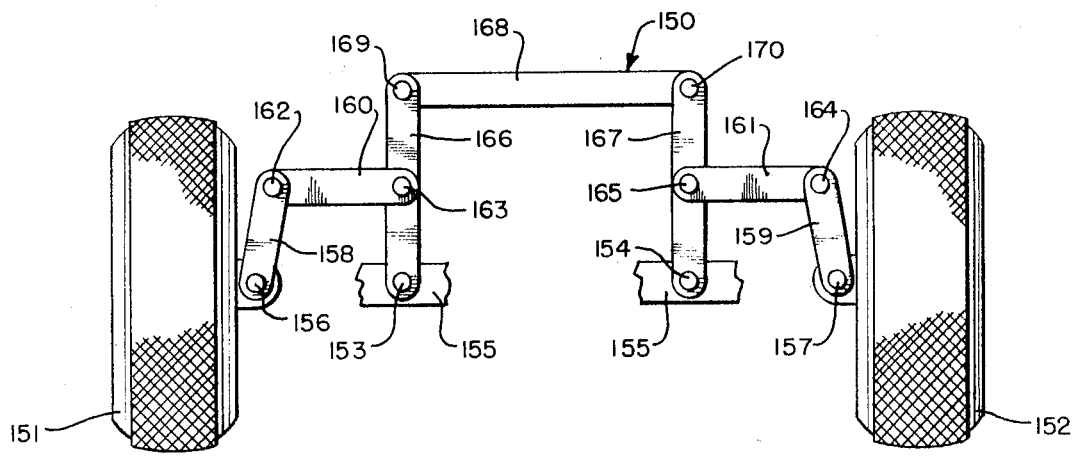
Figure 8:
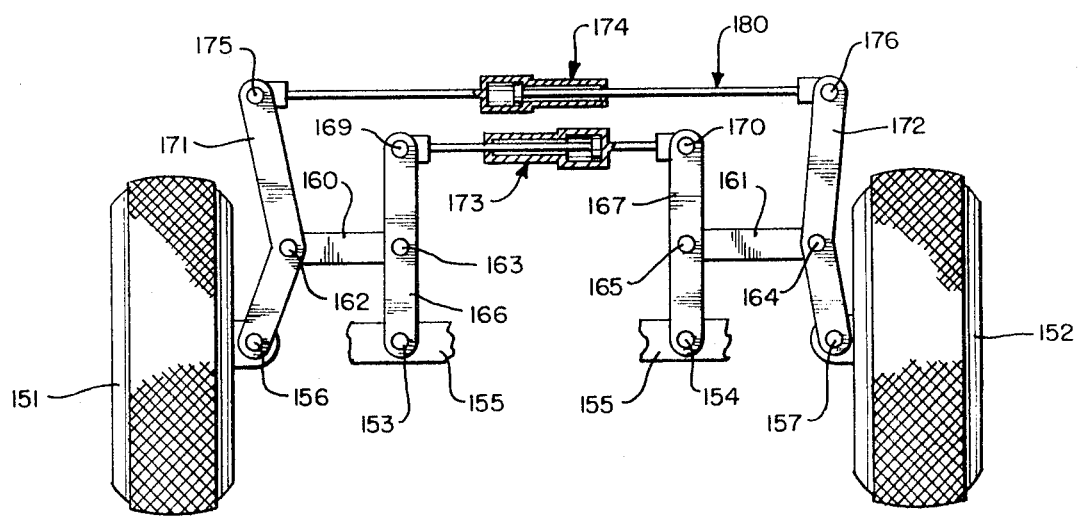
Figure 9:
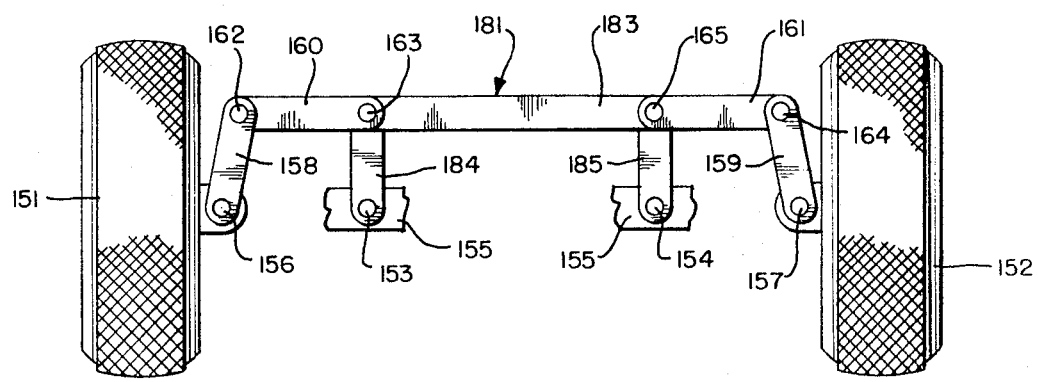
Figure 10:
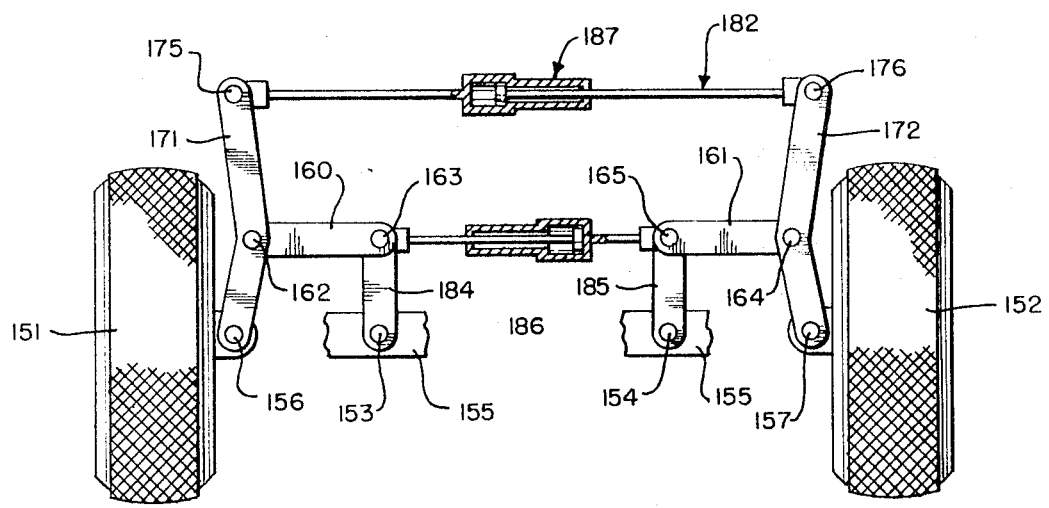

FIGS. 7—10 are schematic representations of multilink steering linkage arrangements for use with vehicles having independent front-wheel suspension systems. FIG. 7 illustrates an Ackerman-type linkage 150 interconnecting tired vehicle front wheels 151 and 152 without the use of a steering mode conversion system. Fig. 8 illustrates the use of tie bar assemblies of the type already described as linking members. Similarly, FIGS. 9 and 10 schematically illustrate multilink steering arrangements with and without tie bar assemblies according to the present invention, respectively.

Referring now in more detail to these arrangements, pivot points 153 and 154, representing the axes of pin connections, are the locations at which linkage 150 is rotatably mounted to the vehicle frame, shown fragmentarily at 155. Kingpin pivot points 156 and 157 represent the pivotal attachment points of link arms 158 and 159 to the independent suspensions of wheels 151 and 152. Link arms 158 and 159 are positioned by link arms 160 and 161 which extend between pivot points 162, 163, and 164, 165, respectively.

Link arms 166 and 167 are connected at points 153 and 154 to vehicle frame 155 and extend to a crossarm 168 where they are rotatably connected at pivot points 169 and 170, respectively. Link arms 160 and 161 are connected to arms 166 and 167 at points 163 and 165.

Pivot point 154 of linkage 150 may be the point of a rigid connection between the linkage 150 and the output shaft of a steering gearbox, not shown. The output shaft and link arm 167 move as an integral unit in this instance.

A look at FIG. 8 will indicate that the linkage 150 of FIG. 7 is modified to include the replacement of link arms 158 and 159 with longer link arms 171 and 172. In addition, crossarm 168 is replaced with a tie bar assembly 173, and a tie bar assembly 174 is added between pivot points 175 and 176 of link arms 171 and 172, respectively.

The operational characteristics and control means for tie bar assemblies 173 and 174 may be of the type already described for tie bar assemblies 25 and 26 (Figs. 1—6), and the entire linkage of FIG. 8 has been designated reference numeral 180.

In operation, an independent rise and fall of each of front wheels, 151 and 152 of linkage 150 as a result of road-caused excitations will not appreciably affect the relative geometric configuration of the link arms, where pivot points 162, 163, 164 and 165 are universal-type joints. The outer ends of link arms 160 and 161 may rise and fall with their associated wheel while the inner ends of those links follow the vehicle chassis motions.

The wheels of linkage 180 are maintained in parallel relationship with respect to one another when the cylinder of tie bar assembly 174 is pressurized or actuated, as shown in FIG. 8. Deflections of the front suspension will not be great or result in deviations from this parallel condition. Since the parallel mode illustrated in FIG. 8 is preferably employed for crabbing-type motion of the vehicle, such deviations occur only at very low vehicle speeds and, thus, do not affect vehicle stability. Negligible or no wear effects on tires at these speeds will result.

Still further multilink arrangements 181 and 182 are schematically shown in FIGS. 9 and 10. In linkage arrangement 181 a crossarm 183 takes the place of crossarm 168 of the linkage 150 and the upper portions of link arms 166 and 167. Link arms 184 and 185 interconnect frame 155 with arms 160, 161 and crossarm 183.

Linkage arrangement 182 of FIG. 10, much like linkage arrangement 180, utilizes tie bar assemblies 186 and 187 to convert from one steering mode to another.

The embodiments of the invention particularly disclosed are presented merely as examples of the invention. Other embodiments, forms and modifications of the invention coming within the proper scope of the appended claims, will of course readily suggest themselves to those skilled in the art.

What I claim is:

1. Steering apparatus for a wheeled vehicle comprising a set of steerable wheels, steering arms operatively connected to said steerable wheels, a plurality of actuatable tie assembles interconnecting said steering arms, said plurality of actuatable tie assemblies comprising a first actuatable tie assembly being adapted, upon actuation, to hold said steerable wheels in a substantially parallel steering relationship and a second actuatable tie assembly being adapted, upon actuation, to hold said steerable wheels in an Ackerman steering relationship, said first actuatable tie assembly being adapted to be deactuated to nonrigidly interconnect said steering arms when said second actuatable tie assembly is actuated, said second actuatable tie assembly being adapted to be deactuated to nonrigidly interconnect said steering arms when said first actuatable tie assembly is actuated.

2. Steering apparatus according to claim 1 wherein said actuatable tie assemblies have hydraulic actuating means.

3. Steering apparatus for a wheeled vehicle comprising at least one set of steerable wheels, linkage means for interconnecting said set of steerable wheels and adapted to hold the wheels of said set in one of a plurality of steering modes, said linkage means comprising steering arms supported by the wheels of a set of said steerable wheels, a plurality of actuatable tie assemblies operatively interconnecting said steering arms, said plurality of actuatable tie assemblies comprising a first actuable tie assembly being adapted, upon actuation, to control means cooperating with said linkage means for changing said linkage means from one steering relationship to another.

4. Steering apparatus according to claim 3 comprising forward and rearward sets of wheels, and interconnecting means for interconnecting said forward and rearward sets of wheels, hold said steerable wheels in a substantially parallel steering relationship and a second actuatable tie assembly being adapted, upon actuation, to hold said steerable wheels in an Ackerman steering relationship, said first actuatable tie assembly being adapted to be deactuated to nonrigidly interconnect said steering arms when said second actuatable tie assembly is actuated, said second actuatable tie assembly being adapted to be deactuated to nonrigidly interconnect said steering arms when said first actuatable tie assembly is actuated and control means cooperating with said linkage means for changing said linkage means from one steering relationship to another.

4. Steering apparatus according to claim 3 comprising forward and rearward sets of wheels, and interconnecting means for interconnecting said forward and rearward sets of wheels.

5. Steering apparatus according to claim 4 wherein said plurality of actuatable tie assemblies operatively interconnect steering arms supported by the wheels of said forward set of wheels.

6. Steering apparatus according to claim 5 including rearward steering arms supported by the wheels of said rearward wheel set and a rearward tie assembly operatively interconnecting said rearward steering arms.

7. Steering apparatus according to claim 6 wherein said actuatable tie assemblies interconnecting the steering arms supported by said forward set of wheels have hydraulic actuating means.

8. Steering apparatus according to claim 7, wherein said rearward tie assembly includes a rod member pivotally secured at each of its ends to a rearward steering arm, said rearward tie assembly maintaining said rearward wheels in substantially constant parallel relationship with respect to one another during movement and turning of said vehicle in any of said steering modes.

9. Steering apparatus according to claim 8 wherein said interconnecting means includes a steering yoke assembly.

10. Steering apparatus for use with a vehicle according to claim 9, said vehicle including a forward axle housing extending between said forward set of wheels and a rearward axle housing extending between said rearward set of wheels, said forward axle housing including a forward gear housing portion, said rearward axle housing including a rearward gear housing portion, said apparatus further comprising forward and rearward pivot assemblies supported by the forward and rearward gear housing portions, respectively, each of said pivot assemblies including a pair of legs integral with and extending at an angle with respect to one another.

11. Steering apparatus according to claim 10, wherein said yoke assembly includes a base plate formed with first and second legs and and further formed with an arcuate slot therethrough, said base plate being supported for rotation about a yoke axis, sprocket wheels mounted on said base plate with said slot disposed between them, a link chain engaging each of said sprocket wheels and forming a closed loop, a header member secured to a link of said chain and having a guide protrusion extending into said slot, and a rearwardly extending tie rod interconnecting said header member and one of the legs of said rearward pivot assembly, the other of said rearward pivot assembly legs being interconnected with a rearward steering arm.

12. Steering apparatus according to claim 11, wherein said steering yoke assembly further includes a motor cooperatively connected to one of said sprocket wheels for causing movement of said chain in either of clockwise or counterclockwise directions, this movement causing guided movement of said header between first, second and third positions between said sprocket wheels, a centerline of said slot extending through said yoke axis, said first and third positions including said header member guide protrusion disposed at the ends of said slot, said second position including said protrusion disposed in coaxial alignment with said yoke axis.

13. Steering apparatus according to claim 12, wherein said steering yoke assembly further includes a forwardly extending tie rod interconnecting said first base plate leg with one of the legs of said forward pivot assembly, the other leg of said pivot assembly being connected to a forward steering arm supported by a forward wheel.

14. Steering apparatus according to claim 13, wherein said steering yoke assembly further comprises centering means for stopping and holding said header member in said second position during its movement between the sprocket wheels.

15. Steering apparatus according to claim 14, comprising a hydraulic piston and cylinder assembly secured to the second leg of said base plate for rotating said steering yoke assembly about the yoke axis, thereby turning a set of wheels.

16. Steering apparatus according to claim 15, wherein said control means includes conduit means for supplying fluid to said hydraulic actuating means, valve means for controlling the flow of said fluid through the conduit means, and selector means for controlling said valve means.

17. Steering apparatus according to claim 16, further comprising electric means responsive to said selector means and connected to said valve means for controlling said valve means.